United States Patent
Yao et al.

(10) Patent No.: US 12,232,056 B2
(45) Date of Patent: *Feb. 18, 2025

(54) POWER CONTROL METHOD, FIRST COMMUNICATION NODE, AND SECOND COMMUNICATION NODE

(71) Applicant: ZTE Corporation, Guangdong (CN)

(72) Inventors: Ke Yao, Shenzhen (CN); Bo Gao, Shenzhen (CN); Chuangxin Jiang, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 91 days.

This patent is subject to a terminal disclaimer.

(21) Appl. No.: 17/946,617

(22) Filed: Sep. 16, 2022

(65) Prior Publication Data

US 2023/0011042 A1   Jan. 12, 2023

Related U.S. Application Data

(63) Continuation of application No. 16/924,083, filed on Jul. 8, 2020, now Pat. No. 11,452,052, which is a
(Continued)

(30) Foreign Application Priority Data

Jan. 12, 2018 (CN) .......................... 201810032290.6

(51) Int. Cl.
*H04W 52/42* (2009.01)
*H04W 28/06* (2009.01)
*H04W 52/14* (2009.01)

(52) U.S. Cl.
CPC ........... *H04W 52/42* (2013.01); *H04W 28/06* (2013.01); *H04W 52/146* (2013.01)

(58) Field of Classification Search
CPC .... H04W 52/42; H04W 52/146; H04W 28/06
See application file for complete search history.

(56) References Cited

U.S. PATENT DOCUMENTS 11,452,052 B2 * 9/2022 Yao ....................... H04W 28/06
2013/0258964 A1 10/2013 Nam et al.
(Continued)

FOREIGN PATENT DOCUMENTS

CN          102395184          3/2012
CN          103037489 A        4/2013
(Continued)

OTHER PUBLICATIONS

ASUSTEK: "Power Control on SRS for beam management" 3GPP TSG RAN WG1 Meeting #91; R1-1720903; Dec. 1, 2017; Reno, USA (4 pages).
(Continued)

*Primary Examiner* — Raymond S Dean
(74) *Attorney, Agent, or Firm* — Foley & Lardner LLP (57) ABSTRACT

Disclosed are a power control method, a first communication node and a second communication node. The power control method includes: configuring, by a first communication node, an association between a power control parameter and reference signal information; and configuring or indicating, by the first communication node, a reference signal of a transmission for a second communication node, so that the second communication node determines a power control parameter of the transmission according to the reference signal of the transmission and the association.

15 Claims, 5 Drawing Sheets

Related U.S. Application Data continuation of application No. PCT/CN2018/109733, filed on Oct. 10, 2018.

(56) References Cited

U.S. PATENT DOCUMENTS

| | | | |
|---|---|---|---|
| 2016/0044611 A1 | 2/2016 | Dai et al. | |
| 2016/0192356 A1 | 6/2016 | Lee et al. | |
| 2016/0219534 A1 | 7/2016 | Hao et al. | |
| 2018/0206132 A1* | 7/2018 | Guo | H04W 72/0473 |
| 2018/0234959 A1* | 8/2018 | Ahn | H04W 72/20 |
| 2018/0332541 A1 | 11/2018 | Liu et al. | |
| 2019/0124598 A1* | 4/2019 | Fakoorian | H04L 5/0035 |
| 2019/0190747 A1* | 6/2019 | Park | H04L 25/0226 |
| 2019/0191382 A1 | 6/2019 | Zhang | |
| 2019/0349864 A1 | 11/2019 | Zhang et al. | |
| 2020/0068549 A1* | 2/2020 | Kang | H04W 16/28 |
| 2020/0280929 A1* | 9/2020 | Chen | H04B 7/0626 |

FOREIGN PATENT DOCUMENTS

| | | |
|---|---|---|
| CN | 103312484 | 9/2013 |
| CN | 104518845 A | 4/2015 |
| EP | 2 487 965 A1 | 8/2012 |
| EP | 3 038 281 A1 | 6/2016 |
| JP | 2016-535471 A | 11/2016 |
| JP | 2020-510383 A | 4/2020 |
| KR | 20170137124 A | 12/2017 |
| WO | WO-2013/164024 A1 | 11/2013 |
| WO | WO-2018/203728 A1 | 11/2018 |
| WO | WO-2019/029381 A1 | 2/2019 |
| WO | WO-2019/096317 A1 | 5/2019 |

OTHER PUBLICATIONS

Extended European Search Report for EP Appl. No. 18899657.3, dated Sep. 24, 2021 (13 pages).
First Office Action for CN Appl. No. 201810032290.6, dated Sep. 15, 2021 (with English translation, 14 pages).
First Office Action for JP Appl. No. 2020-538110, dated Oct. 29, 2021 (with English translation, 24 pages).
First Office Action for KR Appl. No. 10-2020-7023168, dated May 12, 2021 (with English translation, 12 pages).
International Search Report and Written Opinion of the International Searching Authority for PCT/CN2018/109733 dated Jan. 4, 2019 (9 pages).
LG Electronics: "Discussion on UL power control for NR" 3GPP TSG RAN WG1 Meeting 90bis; R1-1717983; Oct. 13, 2017; Prague, Czech (8 pages).
OPPO: Remaining issues on uplink non-codebook transmission; 3GPP TSG RAN WG1 Meeting #91; R1-179965; Dec. 1, 2017; Reno, USA (6 pages).
ZTE et al.: "On NR Power Control Framework" 3GPP TSG RAN WG1 Meeting #91; R1-1719547; Dec. 1, 2017; Reno, USA (10 pages).
3rd Generation Partnership Project, "Technical Specification Group Radio Access Network; NR; Physical layer procedures for control (Release 15)", 3GPP TS 38.213, V15.0.0, Dec. 2017, Sophia Antipolis, Valbonne, France (71 pages).
3rd Generation Partnership Project, "Technical Specification Group Radio Access Network; NR; Physical layer procedures for data (Release 15)", 3GPP TS 38.214, V15.0.0, Dec. 2012, Sophia Antipolis, Valbonne, France (71 pages).
Intel Corporation, "Remaining Issues on non-codebook Based UL Transmission", 3GPP TSG RAN WG1 Meeting 91, R1-1720067, Dec. 1, 2017, Reno, USA (5 pages).
Nokia et al., "Draft RAN1 input to 38.300", 3GPP TSG RAN WG1 Meeting 91, R1-1721728, Dec. 1, 2017, Reno, NV, US (11 pages).
OPPO, "On uplink power control for NR", 3GPP TSG RAN WG1 Meeting#91, R1-1719968, Dec. 1, 2017, Reno, USA (7 pages).
Penultimate Official Action on JP Appl. No. 2020-538110, dated Aug. 26, 2022 (with English translation, 6 pages).

* cited by examiner

POWER CONTROL METHOD, FIRST COMMUNICATION NODE, AND SECOND COMMUNICATION NODE

CROSS-REFERENCES TO RELATED APPLICATIONS

This application claims the benefit of priority under 35 U.S.C. § 120 as a continuation of U.S. patent application Ser. No. 16/924,083, filed Jul. 8, 2020, which claims the benefit of priority under 35 U.S.C. § 120 as a continuation of PCT Patent Application No. PCT/CN2018/109733, filed on Oct. 10, 2018, which claims priority to Chinese patent application No. 201810032290.6, filed on Jan. 12, 2018, the disclosure of each of which is incorporated herein by reference in its entirety.

TECHNICAL FIELD

The present application relates to the field of wireless communication and, in particular, relates to a power control method, a first communication node and a second communication node.

BACKGROUND

Currently, the new radio (NR) technology is under development. As the fifth generation mobile communication system, this technology needs to support an unprecedented number of different types of application scenarios, and also needs to support traditional frequency bands, new high-frequency bands and beam manners at the same time, which brings great challenges to the power control design.

The power control in the long term evolution (LTE) is related to many factors, such as a path loss (PL), a target receiving power, a maximum sending power, a closed-loop power adjustment amount, a transmission bandwidth, and a transmission rate. In a multi-beam scenario in the NR, part of the power control parameters should be related to the beam or transmitted beam pair link (BPL). In order to pursue accurate power control, all power control parameters related to the beam are finally configured and maintained according to the BLP, but parameters related to the BPL are sensitive to channel changes, and any change of a beam used for sending or receiving causes configuration update of the parameters related to the BPL, so that radio resource control (RRC) signaling overhead is large, transmission delay is increased, and flexibility is reduced.

SUMMARY

A power control method, a first communication node and a second communication node are provided in embodiments of the present application so as to reduce high-layer signaling overhead, reduce transmission delay and improve flexibility.

A power control method is provided in the embodiments of the present application. The method includes: configuring, by a first communication node, an association between a power control parameter and reference signal information; and configuring or indicating, by the first communication node, a reference signal of a transmission for a second communication node, so that the second communication node determines a power control parameter of the transmission according to the reference signal of the transmission and the association.

In an embodiment, the reference signal of the transmission is used for determining a transmit manner of the transmission.

In an embodiment, the power control parameter includes at least one of: at least one open-loop power control parameter set or open-loop power control parameter set index, at least one path loss measurement parameter set or path loss measurement parameter set index, or at least one closed-loop power control process parameter or closed-loop power control process index.

The reference signal information includes at least one of: at least one reference signal or reference signal index, at least one reference signal resource or reference signal resource index, at least one spatial relation information or spatial relation information index, at least one reference signal resource group or reference signal resource group index, or at least one reference signal resource combination or reference signal resource combination index.

In an embodiment, an open-loop power control parameter set includes at least one of: a target receiving power or a path loss factor.

Alternatively, a path loss measurement parameter set includes at least one of: a reference signal resource type indication for path loss measurement, a reference signal resource indication for the path loss measurement, or a rule for processing path loss values of two or more reference signals for the path loss measurement.

Alternatively, a closed-loop power control process parameter includes at least one of: a closed-loop power control process identifier set or the number of closed-loop power control processes.

In an embodiment, the reference signal indicated by the reference signal information and a reference signal indicated by the spatial relation information and the reference signal of the transmission are reference signals of a same type or reference signals belonging to a same spatial relation.

In an embodiment, the method further includes that: the first communication node configures at least one reference signal resource set for the second communication node in advance, where the reference signal resource set includes at least one reference signal resource.

In an embodiment, the association between the power control parameter and the reference signal information includes an association between the power control parameter and each reference signal resource in a respective one of part or all of the reference signal resource sets; or an association between the power control parameter and each reference signal resource in a reference signal resource set of a specific type.

In an embodiment, the association between the power control parameter and the reference signal information includes:
an association between the power control parameter and each of all possible combinations of reference signal resources in one of the at least one reference signal resource set; or
an association between the power control parameter and each of part possible combinations of the reference signal resources in the one of the at least one reference signal resource set; or
an association between the power control parameter and the one of the at least one reference signal resource set; or
an association between the power control parameter and a reference signal resource set of a specific type; or
an association between the power control parameter and a reference signal resource group.

In an embodiment, the reference signal resource group is determined in one of the following manners: the first communication node configures or indicates reference signal resources included in each reference signal resource group; or reference signal resources belonging to a same antenna panel belong to a same group.

In an embodiment, the specific type includes one of: a codebook based transmission scheme, or a non codebook based transmission scheme.

In an embodiment, the association includes at least one association relationship component, and each association relationship component includes at least one of: an open-loop power control parameter set index, a path loss measurement parameter set index, or a closed-loop power control process index.

In an embodiment, the association relationship component further includes one of: a reference signal index, a reference signal resource index, a spatial relation information index, a reference signal resource group index, or a reference signal resource combination index.

In an embodiment, the association relationship component corresponds to one of: a reference signal, a reference signal resource, spatial relation information, a reference signal resource group, or a reference signal resource combination.

In an embodiment, the reference signal of the transmission is indicated in a following manner:
at least one reference signal resource is indicated through radio resource control signaling;
the at least one reference signal resource is indicated through media access control control element signaling; or
a subset of the at least one reference signal resource is indicated through the media access control control element signaling, and at least one reference signal resource in the subset is indicated through physical layer signaling; or
the at least one reference signal resource is indicated through the physical layer signaling.

A power control method is further provided in the embodiments of the present application and includes a step described below.

A second communication node receives a reference signal of a transmission that is configured or indicated; and the second communication node determines a power control parameter of the transmission according to a pre-configured association between a power control parameter and reference signal information.

In an embodiment, the method further includes the second communication node receives the configured association.

In an embodiment, the reference signal of the transmission includes one or more reference signal resources; and the step of determining the power control parameter of the transmission includes:
determining a power control parameter of the transmission corresponding to each reference signal resource according to a power control parameter corresponding to the each reference signal resource; or
determining a power control parameter of a layer of the transmission corresponding to the each reference signal resource according to the power control parameter corresponding to the each reference signal resource; or
determining the power control parameter corresponding to the each reference signal resource, and determining one series of power control parameters as power control parameters of the transmission according to a predefined rule or a configured rule; or determining the power control parameter corresponding to the each reference signal resource, and determining a power control parameter corresponding to each group according to reference signal resource groups.

In an embodiment, the predefined rule or the configured rule includes at least one of: averaging, a power maximization criterion, or a power minimization criterion.

In an embodiment, determining the power control parameter of the transmission includes:
determining a power control parameter corresponding to a combination in which a reference signal resource is located; or
determining a power control parameter corresponding to a set in which the reference signal resource is located; or
determining a power control parameter corresponding to a reference signal resource set corresponding to a transmission scheme of the transmission; or
determining a power control parameter corresponding to a group in which the reference signal resource is located.

A power control method is further provided in the embodiments of the present application and includes steps described below.

A first communication node configures at least one series of power control parameters for a second communication node.

The first communication node indicates one series of power control parameters among the at least one series of power control parameters through media access control control element signaling, so that the second communication node performs power control according to the one series of power control parameters indicated through the media access control control element signaling.

Alternatively, the first communication node configures a power control parameter set for the second communication node.

The first communication node indicates at least one series of power control parameters in the power control parameter set through the media access control control element signaling, so that the second communication node performs the power control according to the at least one series of power control parameters indicated through the media access control control element signaling.

The at least one series of power control parameters in the power control parameter set indicated through the media access control control element signaling is in one-to-one correspondence with at least one reference signal of a transmission for the second communication node.

A first communication node is further provided in the embodiments of the present application and includes a first configuration module and a first sending module.

The first configuration module is configured to configure an association between a power control parameter and reference signal information.

The first sending module is configured to configure or indicate a reference signal of a transmission for a second communication node, so that the second communication node determines a power control parameter of the transmission according to the reference signal of the transmission and the association.

A second communication node is further provided in the embodiments of the present application and includes a receiving module and a determination module.

The receiving module is configured to receive a reference signal of a transmission that is configured or indicated.

The determination module is configured to determine a power control parameter of the transmission according to a pre-configured association between a power control parameter and a reference signal.

In an embodiment, the receiving module is further configured to receive and save the configured association.

A first communication node is further provided in the embodiments of the present application and includes a second configuration module and a second sending module.

The second configuration module is configured to configure at least one series of power control parameters for a second communication node, or configure a power control parameter set for the second communication node.

The second sending module is configured to indicate one series of power control parameters among the at least one series of power control parameters through media access control control element signaling, so that the second communication node performs power control according to the one series of power control parameters indicated through the media access control control element signaling; or indicate at least one series of power control parameters in the power control parameter set through the media access control control element signaling, so that the second communication node performs the power control according to the at least one series of power control parameters indicated through the media access control control element signaling.

The at least one series of power control parameters in the power control parameter set indicated through the media access control control element signaling is in one-to-one correspondence with at least one reference signal of a transmission for the second communication node.

A communication node is further provided in the embodiments of the present application and includes a processor and a memory for storing computer programs executable on the processor, where the processor is configured to perform the power control method applied to the first communication node or the power control method applied to the second communication node when the computer programs are executed.

A computer readable storage medium is further provided in the embodiments of the present application, and is configured to store computer programs which, when executed by a processor, implement the power control method applied to the first communication node or the power control method applied to the second communication node.

With the technical solutions provided in the embodiments of the present application, in the first aspect, the first communication node of the present application configures the association between a power control parameter and reference signal information so that the second communication node determines a power control parameter of a transmission according to the reference signal information of the transmission and the association without reconfiguring the power control parameter any time the beam resource changes, which reduces the overhead of high-layer signaling, reduces transmission delay and improve flexibility. In the second aspect, in the present application, the power control parameter is indicated through the MAC CE signaling, so that the overhead of high-layer signaling is reduced, the transmission delay is reduced, and the flexibility is improved.

Other features and advantages of the present application will be elaborated hereinafter in the description and, moreover, partially become apparent from the description, or will be understood through implementation of the present application. The object and other advantages of the present application can be achieved and obtained through structures set forth in the description, claims and drawings.

BRIEF DESCRIPTION OF DRAWINGS

The drawings are provided for a further understanding of the technical solutions of the present application, and constitute a part of the description. The drawings and the embodiments of the present application are used to explain the technical solutions of the present application, and not intended to limit the technical solutions of the present application.

DETAILED DESCRIPTION

The objects, technical solutions and advantages of the present application will be clearer from a detailed description of embodiments of the present application in conjunction with the drawings. It is to be noted that if not in collision, the embodiments and features therein in the present application may be combined with each other.

The steps illustrated in the flowcharts in the drawings may be performed by a computer system such as a group of computers capable of executing instructions. Further, although logical sequences are illustrated in the flowcharts, the shown or described steps may be performed in sequences different from those described herein in some cases.

In a wireless communication system, sending-power control is required for transmission to reduce power consumption of a sending device and reduce interference to other transmission due to unnecessary high-power transmission. The sending power is affected by factors such as the size of a communication range, the maximum sending power and receiving sensitivities of transceiving devices of both parties in a communication, a modulation and coding scheme and the rate of data, an operating frequency band, and a bandwidth occupied by transmission. Generally, lower sending power needs to be used as much as possible under the condition that a quality requirement of a received signal at a receiving end is satisfied.

In general communication technologies, power control includes open-loop power control and closed-loop power control.

Open-loop power control refers to performing power control based on a PL. That is, a first communication node sends a reference signal, and a second communication node measures a PL from the first communication node to the second communication node according to the reference signal. The PL is the difference between the sending power at which the reference signal is sent by the first communication node and the receiving power at which the reference signal is received by the second communication node. It is assumed that a PL of a transmission channel from the second communication node to the first communication node is the same as a PL of a channel from the first communication node to the second communication node, and then the second communication node may use the above PL to calculate a sending power of transmission to the first communication node when the second communication node serves as a sending node. Since the PL is single-sided measured, the PL belongs to the open-loop part of the sending power control. Closed-loop power control refers to that the first communication node makes an analysis after receiving a transmission and provides power adjustment information for the second communication node according to the received quality.

In LTE, a link from a base station to a terminal is a downlink, and a link from the terminal to the base station is an uplink. The sending power of the downlink is determined by channel measurement results of one or more scheduling user equipments (UEs) and the scheduling algorithm. The sending power of the uplink is determined by a combination of open-loop power control and closed-loop power control. In addition, the sending power is also related to specific quantities related to transmission, such as the sending rate, modulation and coding scheme (MCS) level, and sending bandwidth.

The following is the calculation formula for the sending power of the physical uplink shared channel (PUSCH) of LTE. This is used as an example to describe the parameters that affect the sending power.

$$P_{PUSCH,c}(i) = \min\begin{pmatrix} P_{CMAX,c}(i), \\ 10\log_{10}(M_{PUSCH,c}(i)) + P_{O\_PUSCH,c}(m) + \alpha_c(m)PL_c + \Delta_{TF,c}(i) + f_c(i) \end{pmatrix}$$

i is a subframe number, m is used for distinguishing between PUSCH transmissions of different scheduling types or different usages, such as message 3 (Msg3) transmitted on the PUSCH channel in a random access process, a PUSCH transmission with dynamic scheduling, and a PUSCH transmission with semi-persistent authorization, $P_{PUSCH,c}(i)$ is the sending power of the i-th subframe, $P_{CMAX,c}(i)$ is the maximum sending power of the i-th subframe of the UE, $M_{PUSCH,c}(i)$ is the bandwidth (in units of resource blocks (RBs)) occupied by the PUSCH transmission of the i-th subframe in the frequency domain $P_{O\_PUSCH,c}(m)$ is the target receiving power of the m-th type of transmission, $\alpha_c(m)$ is the path loss factor of the m-th type of transmission, $\Delta_{TF,c}(i)$ is the MCS-related power offset, and $f_c(i)$ is the local closed-loop power control adjustment amount of the UE.

In the above formula, the subscript c refers to a cell, and each component carrier (CC) supporting a carrier aggregation (CA) function corresponds to one cell. It can be seen from the above formula that each parameter in the power calculation formula is cell configured or calculated. All parameter descriptions in the present application are provided for one CC, and no specific reference is made to a cell. It is to be noted that all parameters of the present application may be extended to multiple CCs, and merely the power-related parameters need to be configured independently for each CC.

The open-loop part of the $P_{PUSCH,c}(i)$ includes $P_{O\_PUSCH,c}(j)$, $PL_c$ and $\alpha_c(j)$.

The $P_{O\_PUSCH,c}(j)$ is divided into a cell-specific parameter and a UE-specific parameter which are determined and configured by the base station for the UE. The cell-specific target receiving power $P_{O\_nominal}$ is different for the PUSCH (semi-static, dynamic, Msg3) and the physical uplink control channel (PUCCH), which respectively correspond to different block error rate (BLER) requirements. The UE-specific target receiving power $P_{O\_UE\_specific}$ is also set differently for the above different items, and the function is to compensate for systematic deviations, such as a PL estimation error and an error set for absolute output power.

The closed-loop part of $P_{PUSCH,c}(i)$ includes a closed-loop power control adjustment amount. The closed-loop power control adjustment amount is determined by the base station according to the difference between the signal reception quality and the desired reception quality and the UE is notified of the closed-loop power control adjustment amount in a manner of a transmit power control command (TPC command).

The UE maintains a local closed-loop power control adjustment amount, the closed-loop power control adjustment amount is updated according to the transmit power control command, and the purpose of closed-loop power control is achieved by adopting the above formula.

Two manners exist for updating the local closed-loop power control adjustment amount according to the transmit power control command, and are an accumulation manner and an absolute value manner respectively. The accumulation manner refers to determining the local closed-loop power control adjustment amount of the UE jointly according to the transmit power control command sent by the base station and the historical value of the local closed-loop power control adjustment amount of the UE. The absolute value manner refers to updating the local closed-loop power control adjustment amount of the UE directly according to the transmit power control command sent by the base station.

The 5G technology introduces a beam transmission scheme, and both the base station and the UE support the multiple-beam manner. During operation in a beam mode, a feature of a beam needs to be taken into account for power calculation.

Figure 1:
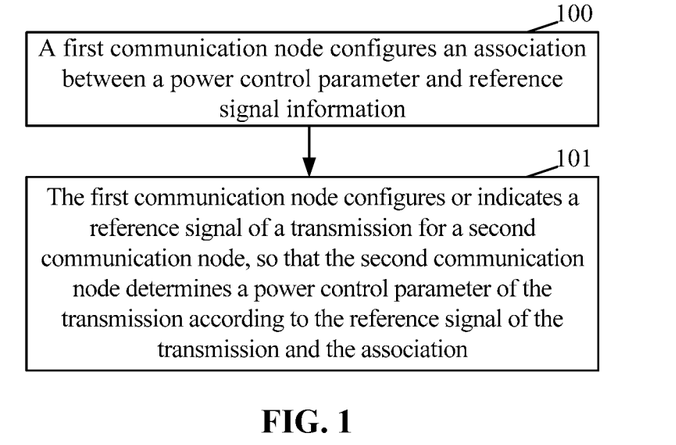
FIG. 1 is a flowchart of a power control method on a first communication node side according to an embodiment of the present application.

Referring to FIG. 1, a power control method is provided in embodiments of the present application and includes steps described below.

In step 100, a first communication node configures an association between a power control parameter and reference signal information.

In the embodiments of the present application, the power control parameter includes at least one of: at least one open-loop power control parameter set or open-loop power control parameter set index, at least one path loss measurement parameter set or path loss measurement parameter set index, or at least one closed-loop power control process parameter or closed-loop power control process index.

In the embodiments of the present application, the reference signal information includes at least one of: at least one reference signal or reference signal index, at least one reference signal resource or reference signal resource index, at least one spatial relation information or spatial relation information index, at least one reference signal resource group or reference signal resource group index, or at least one reference signal resource combination or reference signal resource combination index.

The reference signal resource index may also be denoted as a reference signal resource indication.

The reference signal includes one of: a sounding reference signal, a synchronization signal block, or a channel state information measurement reference signal.

The identifier, index, ID, and indication in the embodiments of the present application are equivalent concepts for identifying one of a plurality of homogeneous items.

The spatial relation is also referred to as a spatial association relation.

The open-loop power control parameter set includes at least one of: a target receiving power or a path loss compensation factor (also referred to as a path loss factor). The path loss measurement parameter set includes at least one of: a reference signal resource type indication for path loss measurement, a reference signal resource indication for the path loss measurement, or a rule for processing a path loss value of a reference signal for the path loss measurement.

The closed-loop power control process parameter includes at least one of: a closed-loop power control process identifier set or the number of closed-loop power control processes.

Different closed-loop power control processes correspond to different local closed-loop power control adjustment amounts.

Here, for example, the open-loop power control parameter set index is denoted by variable j, the path loss measurement parameter set index is denoted by variable k, and the closed-loop power control process index is denoted by variable l. The power control parameter may then be denoted by the set {j, k, l} and the one series of control parameters may be denoted by a subset, such as {j}, {k}, {l}, {j, k}, {j, l}, {k, l}, and {j, k, l}.

In the embodiments of the present application, the association between the power control parameter and the reference signal information includes an association between the power control parameter and each reference signal resource in a respective one of part or all of the reference signal resource sets; or an association between the power control parameter and each reference signal resource in a reference signal resource set of a specific type.

The specific type includes one of: a codebook based transmission scheme, or a non codebook based transmission scheme.

The association between the power control parameter and the reference signal information includes: an association between the power control parameter and each of all possible combinations of reference signal resources in one of the at least one reference signal resource set; or an association between the power control parameter and each of part possible combinations of the reference signal resources in the one of the at least one reference signal resource set; or an association between the power control parameter and the one of the at least one reference signal resource set; or an association between the power control parameter and a reference signal resource set of a specific type; or an association between the power control parameter and the reference signal resource group.

The reference signal resource group described above may be either explicitly configured or implicitly configured. When explicit configuration is adopted, the first communication node configures or indicates reference signal resources included in each group; when implicit configuration is adopted, reference signal resources belonging to the same antenna panel belong to the same group.

In the embodiments of the present application, the association includes at least one association relationship component, and each association relationship component includes at least one of: an open-loop power control parameter set index, a path loss measurement parameter set index, or a closed-loop power control process index.

Optionally, the association relationship component further includes one of: a reference signal index, a reference signal resource index, a spatial relation information index, a reference signal resource group index, or a reference signal resource combination index.

Optionally, the association relationship component corresponds to one of: a reference signal, a reference signal resource, spatial relation information, a reference signal resource group, or a reference signal resource combination.

Optionally, the association relationship component further includes one of: a reference signal, a reference signal resource, spatial relation information, a reference signal resource group, or a reference signal resource combination.

It is to be noted that the above association may be configured through RRC signaling or media access control control element (MAC CE) signaling.

In step 101, the first communication node configures or indicates a reference signal of a transmission for a second communication node, so that the second communication node determines a power control parameter of the transmission according to the reference signal of the transmission and the association.

In the embodiments of the present application, the transmission refers to a channel or a signal.

The channel may be at least one of: a PUSCH, a long PUSCH, a short PUSCH, a physical uplink control channel (PUCCH), a long PUCCH, or a short PUCCH.

The signal may be a sounding reference signal (SRS) and the like.

In the embodiments of the present application, the different types of channels or signals described above may be configured with power control parameters independently or in combination. Configuration in combination refers to that different channels or signals may share the same value, and it is determined in a predefined manner or configured by the first communication node which channels or signals may share the same value.

In the embodiments of the present application, the reference signal of the transmission is used for determining a transmit manner of the transmission. The transmit manner includes at least one of: a sending beam, a sending port, a sending resource, a reference signal sequence, or a sending precoding matrix (in an analog, digital or hybrid manner).

In the embodiments of the present application, the reference signal indicated by the reference signal information and a reference signal indicated by the spatial relation information and the reference signal of the transmission are reference signals of a same type or reference signals belonging to a same spatial relation.

In the embodiments of the present application, the spatial relation is also referred to as a spatial association relation. The spatial relation of the transmission is one or more reference signals or one or more reference signal resources configured for the transmission.

One or more reference signals configured in the spatial relation of the transmission are used for determining the manner in which the transmission is performed, e.g., a sending beam of the transmission is the same as a sending beam of the reference signal, or the sending beam of the transmission and the sending beam of the reference signal satisfy a certain channel feature assumption, or the sending beam of the transmission and the sending beam of the reference signal satisfy a quasi-co-location (QCL) relationship.

The reference signals belonging to the same spatial relation satisfy a certain channel feature assumption, or satisfy the QCL relationship.

In the embodiments of the present application, for example, an SRS or SRS indication information is used for indication. For example, if the spatial relation of the PUSCH is indicated by using the SRS resource, the occupied reference signal resource for sending the PUSCH is the same as the designated reference signal resource of the SRS, or the QCL relationship exists between the occupied reference signal resource for sending the PUSCH and the designated reference signal resource of the SRS.

For another example, a downlink reference signal (RS) resource is used to indicate the spatial relation of the PUSCH, the downlink RS includes a synchronous signal block (SSB), a channel state information reference signal (CSI-RS) and the like, and at this time, the reference signal resource of the transmission is determined in the following manner: a receiving beam having the best performance for receiving the downlink RS is selected as the sending beam of the transmission from a plurality of receiving beams of the second communication node.

In the embodiments of the present application, the reference signal of the transmission is indicated in any one of the following manners: firstly, at least one reference signal resource is indicated through radio resource control (RRC) signaling; secondly, at least one reference signal resource is indicated through MAC CE signaling; thirdly, a subset of the reference signal resources is indicated through media access control control element signaling, and at least one reference signal resource in the subset is indicated through physical layer signaling (e.g., downlink control information (DCI)). Fourthly, at least one reference signal resource is indicated through the physical layer signaling.

Optionally, the method further includes that: the first communication node configures at least one reference signal resource set for the second communication node, where the reference signal resource set includes at least one reference signal resource. The reference signal set is indicated by a reference signal resource set index, and the reference signal resource is indicated by a reference signal resource index.

Figure 2:
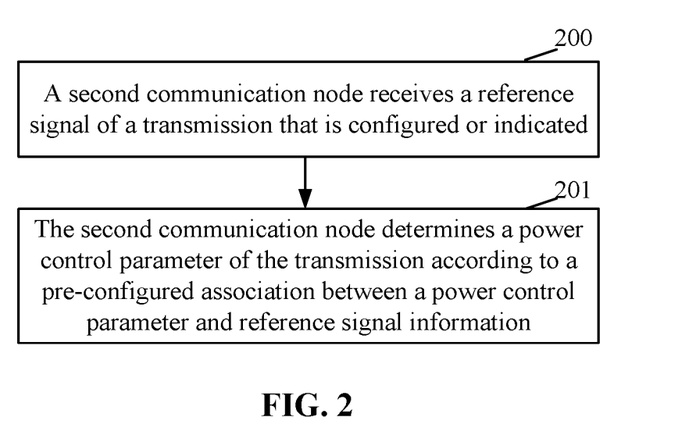
FIG. 2 is a flowchart of a power control method on a second communication node side according to an embodiment of the present application.

Referring to FIG. 2, a power control method is further provided in the embodiments of the present application and includes steps described below.

In step 200, a second communication node receives a reference signal of a transmission that is configured or indicated.

In step 201, the second communication node determines a power control parameter of the transmission according to a pre-configured association between a power control parameter and reference signal information.

In the embodiments of the present application, the second communication node searches for the power control parameter corresponding to the reference signal information corresponding to the reference signal of the transmission according to the association, and takes the found power control parameter as the power control parameter of the transmission.

In the embodiments of the present application, the reference signal of the transmission includes one or more reference signal resources, and the power control parameter of the transmission is determined in at least one of the following manners: firstly, the power control parameter of the transmission corresponding to each reference signal resource is determined according to the power control parameter corresponding to each reference signal resource; specifically, the power control parameter corresponding to each reference signal resource is searched for according to the association. Secondly, a power control parameter of a layer of the transmission corresponding to the each reference signal resource is determined according to the power control parameter corresponding to each reference signal resource. Specifically, the power control parameter corresponding to each reference signal resource is searched for according to the association. The layer herein refers to a spatial layer of the multiple-input multiple-output (MIMO) system. Thirdly, the power control parameter corresponding to each reference signal resource is determined, and one series of power control parameters is determined as the power control parameters of the transmission according to a predefined rule or a configured rule. The predefined rule or the configured rule includes at least one of: averaging, a power maximization criterion, or a power minimization criterion. For specific implementation, reference may be made to the first embodiment and will not be described in detail herein. Fourthly, the power control parameter corresponding to each reference signal resource is determined, and power control parameters corresponding to each group is determined according to the reference signal resource groups. The power control parameters corresponding to each group are the power control parameters of the transmission corresponding to each group. One series of power control parameters is determined as the power control parameters corresponding to a group according to power control parameters corresponding to reference signal sources in accordance with a predefined rule or a configured rule.

In the embodiments of the present application, the step of determining the power control parameter of the transmission includes that: a power control parameter corresponding to a combination where the reference signal resource is located is determined, that is, the power control parameter corresponding to the combination where the reference signal resource is located is searched for according to the association.

Alternatively, a power control parameter corresponding to the set where the reference signal resource is located is determined, that is, the power control parameter corresponding to the set where the reference signal resource is located is searched for according to the association.

Alternatively, a power control parameter corresponding to a reference signal resource set corresponding to a transmission scheme of the transmission is determined, that is, the power control parameter corresponding to the transmission scheme corresponding to the reference signal resource is searched for according to association.

Alternatively, a power control parameter corresponding to the group where the reference signal resource is located is determined, that is, the power control parameter corresponding to the group where the reference signal resource is located is searched for according to the association.

Optionally, the method further includes: the second communication node receives and saves the configured association.

In the embodiments of the present application, the first communication node or the second communication node may be any one of: a base station, a UE, a NodeB (NB), a g-NodeB (gNB), a Transmit-Receive point (TRP), an access point (AP), a station (STA), a user equipment, a relay node, a terminal and the like.

Figure 3:
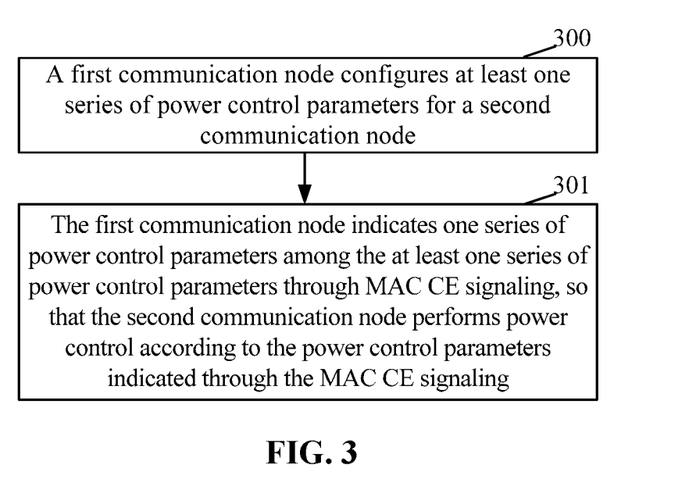
FIG. 3 is a flowchart of another power control method on a first communication node side according to an embodiment of the present application.

Referring to FIG. 3, a power control method is further provided in the embodiments of the present application and includes steps described below.

In step 300, a first communication node configures at least one series of power control parameters for a second communication node.

In the embodiments of the present application, the first communication node may configure a power control parameter by configuring a mapping relationship between a power control parameter identifier and the power control parameter.

In the embodiments of the present application, the first communication node may configure at least two series of power control parameters for the second communication node through RRC signaling.

In step 301, the first communication node indicates one series of power control parameters among the at least one series of power control parameters through MAC CE signaling, so that the second communication node performs power control according to the power control parameters indicated through the MAC CE signaling.

In the embodiments of the present application, the power control parameters indicated in the MAC CE signaling may be denoted by using power control parameter identifiers.

In the embodiments of the present application, one series of power control parameters among at least two series of power control parameters indicated in the MAC CE signaling is used for the second communication node to send the power control parameters of the transmission by using any beam resource or spatial relation or reference signal resource.

In the embodiments of the present application, the power control parameters are indicated through the MAC CE signaling, so that the overhead of high-layer signaling is reduced, the transmission delay is reduced, and the flexibility is improved.

Figure 4:
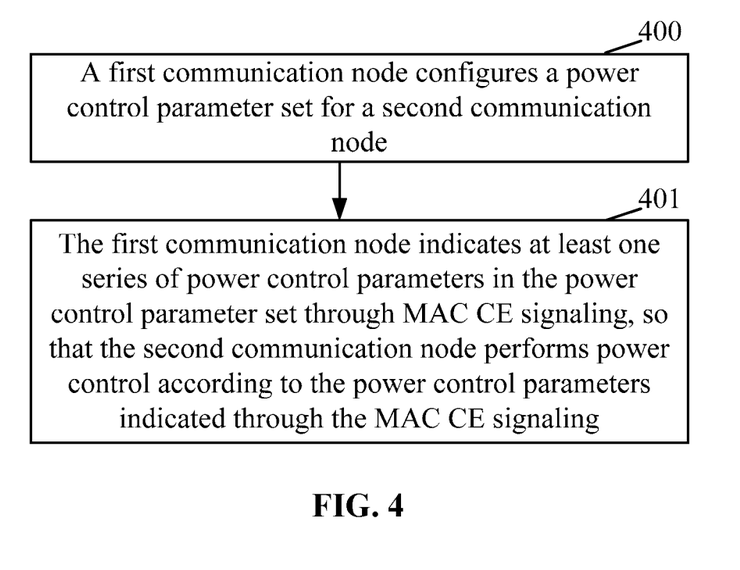
FIG. 4 is a flowchart of another power control method on a first communication node side according to an embodiment of the present application.

Referring to FIG. 4, a power control method is provided in the present application and includes steps described below.

In step 400, a first communication node configures a power control parameter set for a second communication node.

In the embodiments of the present application, the first communication node may configure the power control parameter set by configuring a mapping relationship between a power control parameter identifier and a power control parameter.

In the embodiments of the present application, the power control parameter set includes at least two series of power control parameters.

In the embodiments of the present application, the first communication node may configure the power control parameter set for the second communication node through RRC signaling.

In step 401, the first communication node indicates at least one series of power control parameters in the power control parameter set through MAC CE signaling, so that the second communication node performs power control according to the power control parameters indicated through the MAC CE signaling.

In the embodiments of the present application, the power control parameters indicated in the MAC CE signaling may be denoted by using power control parameter identifiers.

In the embodiments of the present application, at least one series of power control parameters in the power control parameter set indicated by the media access control control element signaling has an implicit association with at least one reference signal of the transmission for the second communication node, that is, the power control parameters indicated by the MAC CE signaling is in one-to-one correspondence with at least one reference signal resource. In this way, the second communication node performs power control by using the power control parameters corresponding to the at least one reference signal resource for sending the transmission.

In the embodiments of the present application, the power control parameters are indicated through the MAC CE signaling, so that the overhead of high-layer signaling is reduced, the transmission delay is reduced, and the flexibility is improved.

The specific implementation of the power control method provided in the present application is described in detail below by taking an SRS resource as a beam resource or a spatial relation or a reference signal resource as an example.

The SRS of the NR supports different functions such as beam management, uplink channel state information acquisition (UL CSI acquisition), and downlink channel state information acquisition (DL CSI acquisition).

The first communication node (e.g., a base station) configures at least one SRS resource set for the second communication node (e.g., a UE), and each SRS resource set includes at least one SRS resource. The SRS resource set is denoted by an SRS resource set identifier, and the SRS resource is denoted by an SRS resource identifier.

Each SRS resource indicates the resource occupied by the SRS, which includes a time domain, a frequency domain, a code domain and other parameters. The SRS resource set indicates that the SRS resource may be periodic, aperiodic, or semi-persistent. Different SRS resource sets may be scheduled in different manners. For example, for the periodic manner, merely RRC signaling is required for configuration, and the second communication node (e.g., UE) sends the SRS at the corresponding position (e.g., time-frequency domain). For the semi-persistent manner, the RRC signaling is required for configuration, MAC CE signaling is used for activation, and the second communication node (e.g., UE) needs to send the SRS at the position indicated by the activated SRS resource set. For the aperiodic manner, the RRC signaling is required for configuration, and the physical layer signaling triggers the second communication node (UE) to send the SRS at a designated position. For the aperiodic manner, the MAC CE signaling may further be required to activate part of SRS resource sets configured through the RRC signaling to reduce the indication overhead of the SRS resource set through the physical layer trigger signaling.

Embodiment One

Figure 5:
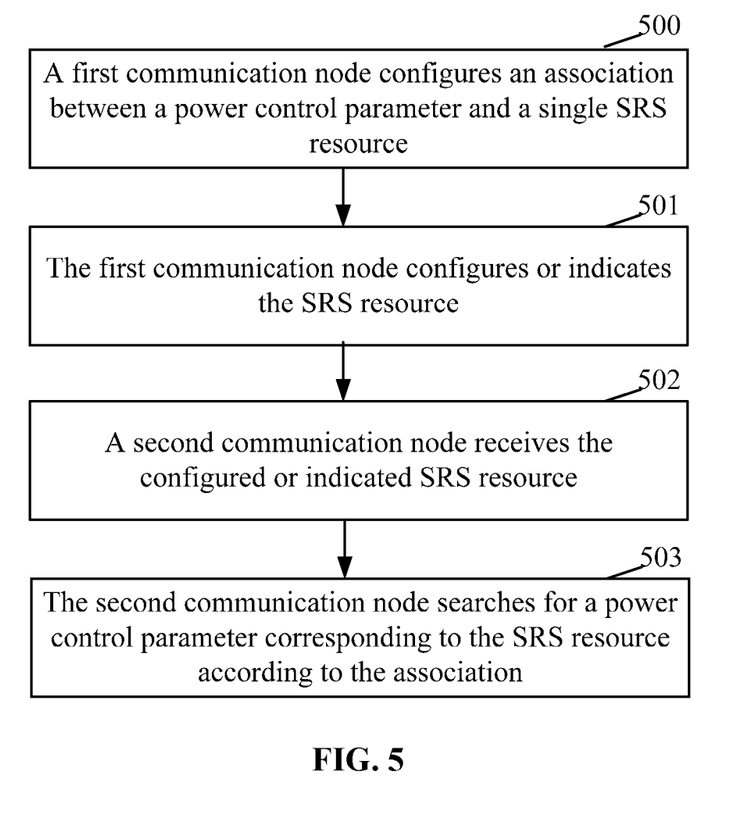
FIG. 5 is a flowchart of a power control method according to a first embodiment of the present application.

In the present embodiment, a first communication node configures an association between a power control parameter and a single SRS resource. Referring to FIG. 5, the method includes steps described below.

In step 500, the first communication node configures the association between the power control parameter and the single SRS resource.

In the present embodiment, the association includes any type described below.

For the first association type, an association between each of some or all of the SRS resources and the power control parameter is configured.

For example, a base station configures three SRS resource sets for a UE firstly, where SRS resource set 1 includes eight SRS resources for beam management; SRS resource set 2 includes two SRS resources for a codebook based transmission; SRS resource set 3 includes four SRS resources for a non codebook based transmission. The base station then configures an association between each of the two SRS resources in SRS resource set 2 and a power control parameter, and an association between each of the four SRS resources in SRS resource set 3 and a power control parameter.

The SRS resource described above may be indicated by using SRS resource information (also referred to as SRS resource indication) (SRI). The SRI may be indicated in any of the following manners.

For the first indication manner: an SRS resource set identifier (ID) and a local SRS resource identifier are used for joint indication. The local SRS resource identifier refers to the index of an SRS resource in the SRS resource set.

For example, the base station configures the following associations for the UE:

SRI1 (SRS resource set identifier 1, local SRS resource identifier 1): j1, k1, l1;
SRI1 (SRS resource set identifier 2, local SRS resource identifier 2): j2, k2, l1;
SRI3 (SRS resource set identifier 3, local SRS resource identifier 1): j3, k3, l2;
. . . .

For the second indication manner: a global SRS resource identifier is used for indication. The global SRS resource identifier is an index of all SRS resources configured for the UE or an index of all SRS resources configured for a specific range of the UE. The specific range includes at least one of: a specific serving cell, a specific bandwidth Part (BWP), or a specific carrier.

For example, the base station configures the following associations for the UE:

SRI1 (global SRS resource identifier 1): j1, k1, l1;
SRI1 (global SRS resource identifier 1): j2, k2, l1;
. . . .

For the second association type, an association between each SRS resource in an SRS resource set of a preset type and a power control parameter is configured.

The preset type may refer to a transmission type including a codebook based transmission scheme and a non codebook based transmission scheme.

When the transmission type is the codebook based transmission scheme, an association between each SRS resource in an SRS resource set used for the codebook based transmission and a power control parameter is configured.

When the transmission type is the non codebook based transmission scheme, an association between each SRS resource in an SRS resource set used for the non codebook based transmission and a power control parameter is configured.

The SRS resource described above may be indicated by using the SRI. The SRI may be indicated by using an SRS resource identifier in an SRS resource set of a preset type.

For example, the base station configures three SRS resource sets for the UE firstly, where SRS resource set 1 includes eight SRS resources for beam management; SRS resource set 2 includes two SRS resources for the codebook based transmission; SRS resource set 3 includes four SRS resources for the non codebook based transmission.

Then, when the transmission type is the codebook based transmission scheme, the base station configures an association between each of the two SRS resources in SRS resource set 2 and a power control parameter; when the transmission type is the non codebook based transmission scheme, the base station configures an association between each of the four SRS resources in SRS resource set 3 and a power control parameter.

The SRI in the above association may be indicated in an explicit manner as described above, or in an implicit manner. For example, the association between SRS resources and power control parameters is configured according to the order and number of SRS resources configured in the SRS resource set of a preset type.

As described above, the SRS resource in SRS resource set 2 is used for the codebook based transmission, and when the transmission type is the codebook based transmission scheme, the base station configures the association between each of the two SRS resources in SRS resource set 2 and the power control parameter. Specifically, the following two associations are included: associations corresponding to two SRS resources in SRS resource set 2, that is, j1, k1 l1; and j2, k2, l1.

The configuration of the transmission type of the SRS resource set may be indicated in the SRS resource set or may be obtained from a configuration of transmission configuration parameters of the codebook based transmission scheme or the non codebook based transmission scheme in combination with usage parameters of the SRS resource set. For example, the usage parameter for an SRS resource set may be configured as: a beam management, an antenna selection, a codebook based configuration and a non codebook based configuration; or the usage parameter for the SRS resource set may be configured as: beam management, antenna selection, and others. "Others" include both the codebook based configuration and the non codebook based configuration. In combination with the codebook based configuration or the non codebook based configuration in the transmission configuration parameters, it can be determined that the SRS resource set is used for the codebook based configuration or the non codebook based configuration.

In step 501, the first communication node configures or indicates the SRS resource.

In step 502, a second communication node receives the configured or indicated SRS resource.

In step 503, the second communication node searches for a power control parameter corresponding to the SRS resource according to the association.

In the present embodiment, when the second communication node sends a channel or a signal by using at least two SRS resources, the power control parameters corresponding to the SRS resources are determined in at least one of the following manners.

Manner 1: At least two SRS resources belong to different layers, and a power control parameter corresponding to the SRS resource belonging to each layer is determined. Specifically, the power control parameter corresponding to the SRS resource belonging to each layer is searched for according to the association.

Manner 2: At least two series of power control parameters corresponding to at least two SRS resources are determined, and one series of power control parameters is determined according to a predefined rule or a configured rule. Specifically, when at least two series of power control parameters corresponding to at least two SRS resources are determined, one series of power control parameters corresponding to each SRS resource is searched for according to the association.

The predefined rule or the configured rule includes at least one of: an averaging algorithm, a power maximization criterion, or a power minimization criterion.

The averaging algorithm includes at least one of the following manners.

For one averaging algorithm manner, when closed-loop power control processes corresponding to at least two SRS resources are consistent, if the at least two SRS resources correspond to a plurality of k, that is, the configuration of the plurality of downlink RSs is used for calculation of the PLs, and the average value of the PLs of the plurality of downlink RSs is used as the PL for each SRS resource; if at least two SRS resources correspond to a plurality of j, that is, to a plurality of target receiving powers and path loss compensation factors, the average value of the plurality of target receiving powers is used as the target receiving power for each SRS resource, and the average value of the plurality of path loss compensation factors is used as the path loss compensation factor.

For another averaging algorithm manner, when the closed-loop power control processes corresponding to the at least two SRS resources are inconsistent, power control parameters corresponding to the SRS resources with consistent closed-loop power control processes are averaged, and the averaging method is the same as described above.

The power maximization criterion includes at least one of the following manners.

For one power maximization criterion manner, when closed-loop power control processes corresponding to at least two SRS resources are consistent, if the at least two SRS resources correspond to a plurality of k, that is, the configuration of the plurality of downlink RSs is used for calculation of the PLs, and the maximum value of the PLs of the plurality of downlink RSs is used as the PL for each SRS resource; if at least two SRS resources correspond to a plurality of j, that is, to a plurality of target receiving powers and path loss compensation factors, the maximum value of the plurality of target receiving powers is used as the target receiving power for each SRS resource, and the maximum value of the plurality of path loss compensation factors is used as the path loss compensation factor.

For another power maximization criterion manner, when the closed-loop power control processes corresponding to the at least two SRS resources are inconsistent, the power maximization criterion is used for power control parameters corresponding to the SRS resources with consistent closed-loop power control processes.

The power minimization criterion includes at least one of the following manners.

For one power minimization criterion manner, when closed-loop power control processes corresponding to at least two SRS resources are consistent, if the at least two SRS resources correspond to a plurality of k, that is, the configuration of the plurality of downlink RSs is used for calculation of the PLs, and the minimum value of the PLs of the plurality of downlink RSs is used as the PL for each SRS resource; if at least two SRS resources correspond to a plurality of j, that is, to a plurality of target receiving powers and path loss compensation factors, the minimum value of the plurality of target receiving powers is used as the target receiving power for each SRS resource, and the minimum value of the plurality of path loss compensation factors is used as the path loss compensation factor.

For another power minimization criterion manner, when the closed-loop power control processes corresponding to the at least two SRS resources are inconsistent, the power minimization criterion is used for power control parameters corresponding to the SRS resources with consistent closed-loop power control processes. Manner 3: When the at least two SRS resources belong to different groups, a power control parameter corresponding to each group of the at least two SRS resources is determined.

Embodiment Two

Figure 6:
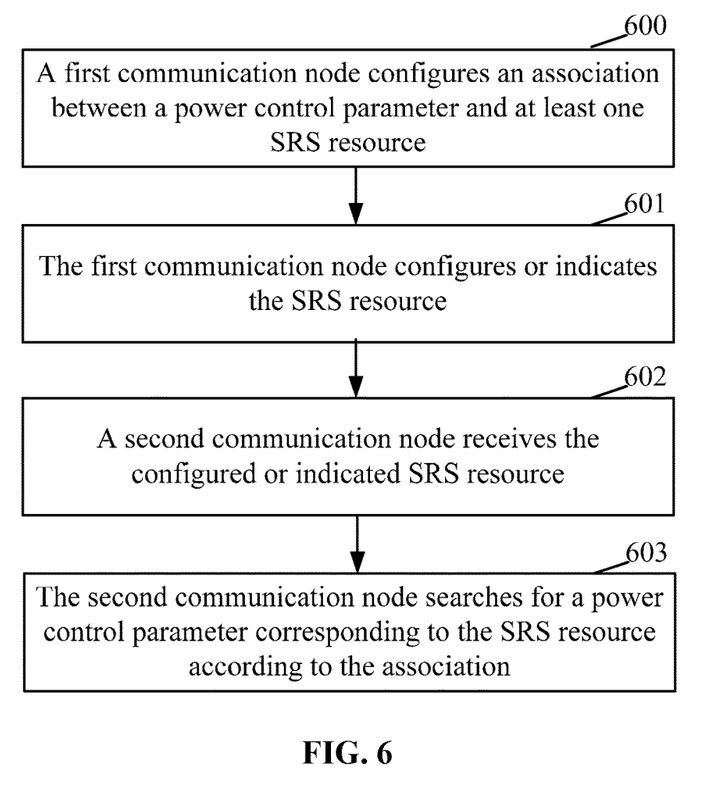
FIG. 6 is a flowchart of a power control method according to a second embodiment of the present application.

In the present embodiment, a first communication node configures an association between a power control parameter and at least one SRS resource. Referring to FIG. 6, the method includes steps described below.

In step 600, the first communication node configures the association between the power control parameter and the at least one SRS resource.

In the present embodiment, the association includes any type described below.

The first type is about an association between all possible combinations of SRS resources indicated in DCI and power control parameters.

For example, SRS resource set 3 includes four SRS resources for the non codebook based transmission. When the transmission scheme of the channel or signal is the non codebook based transmission scheme, 2 bits are used for indicating SRS resources (i.e., SRI) in the scheduling information such as in the DCI of the channel or signal.

When the at least two SRS resources belong to different layers, the power control parameters corresponding to the at least two SRS resources may be that the SRS resources of the same layer correspond to the same power control parameters, or that the SRS resources of different layers correspond to the same power control parameters.

When the SRS resources of different layers correspond to the same power control parameters, one series of power control parameters may be determined in the manner of the first embodiment, i.e., according to at least two series of power control parameters corresponding to at least two SRS resources in accordance with a certain rule, and one series of power control parameters may also be configured for a different SRI combination.

For example, four SRIs have up to 15 combinations, which are: SRI1, SRI2, SRI3, SRI4, SRI1 SRI2, SRI1 SRI3, SRI1 SRI4, SRI2 SRI3, SRI2 SRI4, SRI3 SRI4, SRI1 SRI2 SRI3, SRI1 SRI2 SRI4, SRI1 SRI3 SRI4, SRI2 SRI3 SRI4, and SRI1 SRI2 SRI3 SRI4.

One series of power control parameters is configured for each SRS resource combination described above, and then 4 bits are required for indicating the SRS resource combination in scheduling information such as DCI of a channel or signal; or SRS resources in the scheduling information such as DCI of the channel or signal are indicated for a plurality of layers, and 2 bits are required for indicating each SRS resource.

Alternatively, the above four SRIs have 15 combinations, and the relationship between all or part of these 15 combinations and the power control parameters may be configured in the association. The SRI included in the combination denoted by each combination index is pre-configured.

The second type is about an association between an SRS resource set and a power control parameter.

When any SRS resource in the SRS resource set is used to transmit a channel or signal, the corresponding power control parameter is a power control parameter indicated in the same series of {j, k, l}.

For example, four SRS resources are configured in a SRS resource set for the non codebook based transmission, and share one series of power control parameters configured on the SRS resource set.

The third type is about an association between a transmission scheme corresponding to an SRS resource and a power control parameter.

When any SRS resource corresponding to a same transmission scheme is used to transmit a channel or signal, the corresponding power control parameter is a power control parameter indicated in the same series of {j, k, l}.

The transmission scheme includes at least one of: a non codebook based transmission scheme or a codebook based transmission scheme.

For example, four SRS resources are configured in a SRS resource set for a non codebook based transmission, and share one series of power control parameters configured on the SRS resource set.

The fourth type is about an association between a group where an SRS resource is located and a power control parameter when SRS resources are grouped according to a certain characteristic.

A manner of grouping the SRS resources described above may be either explicitly configured or implicitly configured.

For example, if four SRS resources are used for the non codebook based transmission, the first two belong to a group and the second two belong to a group, and then the grouping manner may be explicitly indicated through RRC signaling.

For another example, it is determined whether SRS resources belong to the same antenna panel through phase tracking reference signal (PTRS) configuration, and SRS resources belonging to the same antenna panel belong to one group.

The number of associations is in one-to-one correspondence with SRS resource combinations or SRS resource sets or transmission schemes corresponding to SRS resources or SRS resource groups.

In step 601, the first communication node configures or indicates the SRS resource.

In step 602, a second communication node receives the configured or indicated SRS resource.

In step 603, the second communication node searches for a power control parameter corresponding to the SRS resource according to the association.

In the present embodiment, when the first communication node configures the associations between all possible combinations of SRS resources indicated in the DCI and the power control parameters, the second communication node searches for a power control parameter corresponding to a combination of SRS resources according to the association.

When the first communication node configures the association between the SRS resource set and the power control parameter, the second communication node searches for the power control parameter corresponding to the SRS resource set according to the association. When the first communication node configures the association between the transmission scheme of the SRS resource and the power control parameter, the second communication node searches for the power control parameter corresponding to the transmission scheme of the SRS resource according to the association. When the first communication node configures the association between the group where the SRS resource is located and the power control parameter, the second communication node searches for the power control parameter corresponding to the group where the SRS resource is located according to the association.

Embodiment Three

Figure 7:
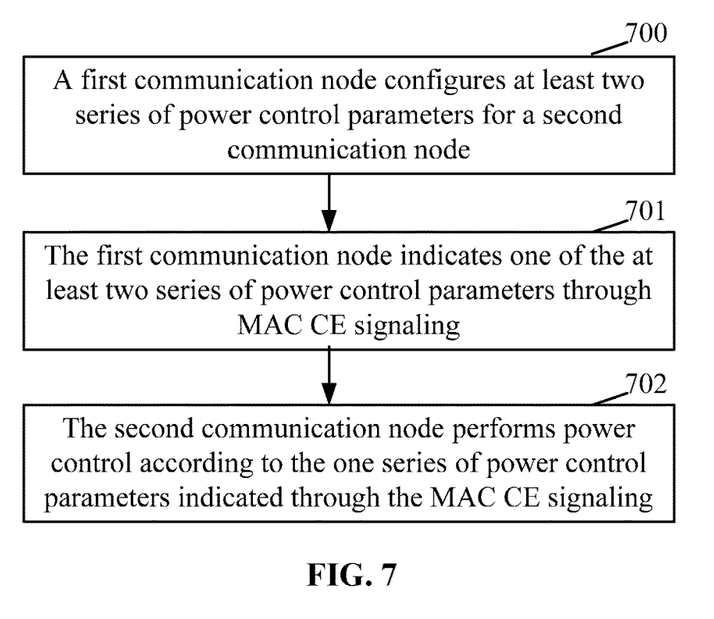
FIG. 7 is a flowchart of a power control method according to a third embodiment of the present application.

In the present embodiment, a first communication node indicates one series of power control parameters through MAC CE signaling. Referring to FIG. 7, the method includes steps described below.

In step 700, the first communication node configures at least two series of power control parameters for a second communication node.

In step 701, the first communication node indicates one of the at least two series of power control parameters through MAC CE signaling.

In step 702, the second communication node performs power control according to the one series of power control parameters indicated through the MAC CE signaling.

Embodiment Four

Figure 8:
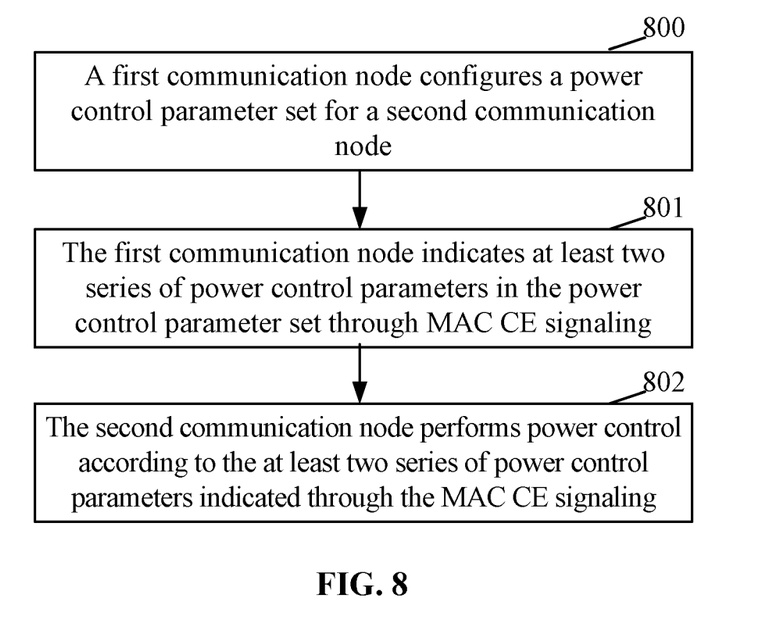
FIG. 8 is a flowchart of a power control method according to a fourth embodiment of the present application.

In the present embodiment, a first communication node indicates at least one series of power control parameters through MAC CE signaling. Referring to FIG. 8, the method includes steps described below.

In step 800, the first communication node configures a power control parameter set for a second communication node.

In the present embodiment, the power control parameter set includes at least two series of power control parameters.

In step 801, the first communication node indicates at least two series of power control parameters in the power control parameter set through MAC CE signaling.

In the present embodiment, the at least two series of power control parameters indicated through the MAC CE signaling are in one-to-one correspondence with at least one SRS resource (such as an SRS resource combination) indicated in DCI, and the one-to-one correspondence is an implicit association.

In step 802, the second communication node performs power control according to the at least two series of power control parameters indicated through the MAC CE signaling.

In the present embodiment, the second communication node determines power control parameters corresponding to an SRS resource among the at least two series of power control parameters indicated through MAC CE signaling as power control parameters corresponding to the SRS resource.

Related terms appearing in the embodiments of the present application are explained below.

The transmit manner includes at least one of: a sending beam, a sending port, a sending resource, a reference signal sequence, or a sending precoding matrix (in an analog, digital or hybrid manner).

The receiving manner includes at least one of: a receiving beam, a receiving port, a receiving resource, a reference signal sequence, a receiving precoding matrix (in an analog, digital or hybrid manner) or a receiver algorithm.

The beam may be a resource or a transmission (sending or receiving) manner. A resource may be a sending end precoding, a receiving end precoding, an antenna port, an antenna weight vector, an antenna weight matrix, and the like. A beam number may be replaced with a resource index since the beam may be bound to some time-frequency code resources for transmission. The beam may also be a transmission (sending or receiving) manner. The transmission scheme may include spatial division multiplexing, frequency domain/time domain diversity and the like.

The beam indication refers to an indication performed by the sending end when a current reference signal and antenna port and a reference signal (or a standard reference signal) and antenna port scanned by the base station or fed back and reported by the UE satisfy a QCL assumption.

The receiving beam refers to a beam at the receiving end which does not need to be indicated, or a beam resource at the receiving end which are indicated by the sending end under the QCL of the current reference signal and antenna port and the reference signal (or the standard reference signal) and antenna port scanned by the base station or fed back and reported by the UE.

The channel feature includes a feature of a physical propagation channel, such as a horizontal sending azimuth, a vertical sending azimuth, a horizontal receiving azimuth and a vertical receiving azimuth, and also includes features of radio frequency and baseband circuits, such as an antenna element pattern, an antenna group, an antenna panel, an antenna subarray, transceiver units (TXRU), a receiving beam set, antenna placement, and a baseband time offset, frequency offset and phase noise.

Parameters related to the QCL at least include: Doppler spread, Doppler shift, delay spread, average delay and average gain, and may also include spatial parameter information, such as an angle of arrival, a spatial correlation of the receiving beam, the average delay and a time-frequency channel response correlation (including phase information).

Figure 9:
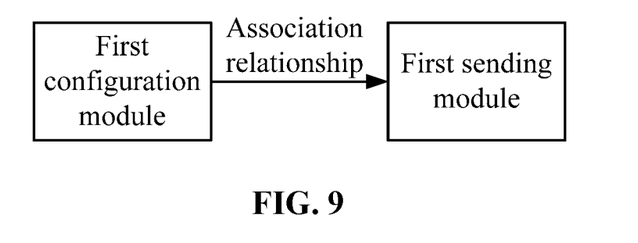
FIG. 9 is a structural diagram of a first communication node according to an embodiment of the present application.

Referring to FIG. 9, a first communication node is provided in the embodiments of the present application and includes a first configuration module and a first sending module.

The first configuration module is configured to configure an association between a power control parameter and reference signal information.

The first sending module is configured to configure or indicate a reference signal of a transmission for a second communication node, so that the second communication node determines a power control parameter of the transmission according to the reference signal of the transmission and the association.

Figure 10:
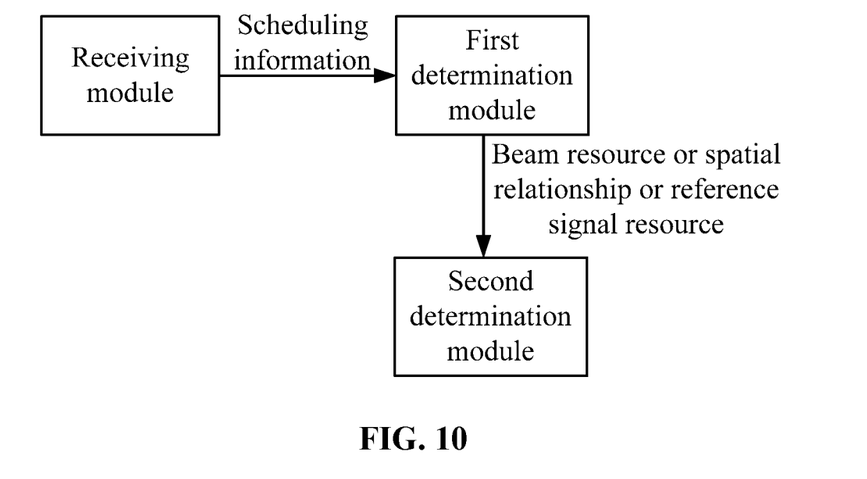
FIG. 10 is a structural diagram of a second communication node according to an embodiment of the present application.

Referring to FIG. 10, a second communication node is provided in the embodiments of the present application and includes a receiving module and a determination module.

The receiving module is configured to receive a reference signal of a transmission that is configured or indicated.

The determination module is configured to determine a power control parameter of the transmission according to a pre-configured association between the power control parameter and a reference signal.

Optionally, the receiving module is further configured to receive and save the configured association.

Figure 11:
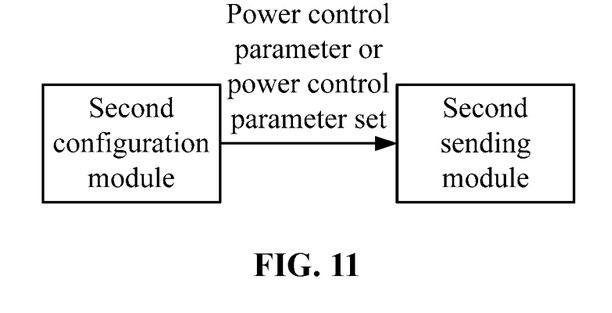
FIG. 11 is another structural diagram of a first communication node according to an embodiment of the present application.

Referring to FIG. 11, a first communication node is further provided in the embodiments of the present application and includes a second configuration module and a second sending module.

The second configuration module is configured to configure at least one series of power control parameters for a second communication node, or configure a power control parameter set for the second communication node.

The second sending module is configured to indicate one series of power control parameters among the at least one series of power control parameters through MAC CE signaling, so that the second communication node performs power control according to the one series of power control parameters indicated through the MAC CE signaling; or indicate at least one series of power control parameters in the power control parameter set through the media access control control element signaling, so that the second communication node performs the power control according to the at least one series of power control parameters indicated through the media access control control element signaling.

The at least one series of power control parameters in the power control parameter set indicated through the media access control control element signaling is in one-to-one correspondence with at least one reference signal of a transmission for the second communication node.

It is to be noted that: when performing power control, the communication node (including the first communication node and/or the second communication node) provided in the embodiment described above is exemplified merely by the division of the program modules described above, and in practical applications, the processing described above may be distributed and performed by different program modules according to needs, that is, the internal structure of the communication node is divided into different program modules to perform all or part of the processing described above. In addition, the communication node in the embodiment described above has the same concept as the power control method in the method embodiment, and for a specific implementation process, reference is made to the method embodiment, which is not repeated herein.

Figure 12:
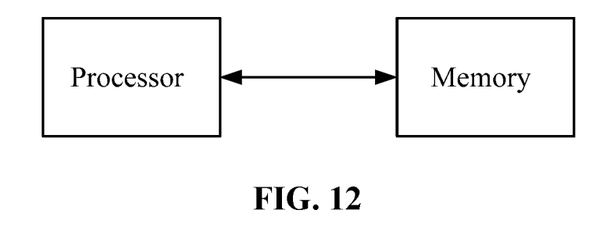
FIG. 12 is a structural diagram of a communication node according to an embodiment of the present application.

Referring to FIG. 12, a communication node is further provided in the embodiments of the present application and includes a processor and a memory for storing computer programs executable on the processor, where the processor is configured to perform the power control method applied to the first communication node or the power control method applied to the second communication node when the computer programs are executed.

A computer readable storage medium is further provided in the embodiments of the present application, and is configured to store computer programs which, when executed by a processor, implement the power control method applied to the first communication node or the power control method applied to the second communication node.

The memory may be implemented by any type of volatile or non-volatile storage device or a combination thereof. The non-volatile memory may be a read only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk or a compact disc read-only memory (CD-ROM). The magnetic surface memory may be a magnetic click memory or a magnetic tape memory. The volatile memory may be a random access memory (RAM), which serves as an external cache. By way of illustration but not limitation, many forms of RAMs may be used, such as a static random access memory (SRAM), a synchronous static random access memory (SSRAM), a dynamic random access memory (DRAM), a synchronous dynamical random access memory (SDRAM), a double data rate synchronous dynamic random access memory (DDRSDRAM), an enhanced synchronous dynamic random access memory (ESDRAM), a syncLink dynamic random access memory (SLDRAM), and a direct rambus random access memory (DRRAM). The memory described in the embodiments of the present invention is intended to include, but is not limited to, these and any other suitable type of memory.

The methods disclosed by the embodiments of the present application may be applied to a processor or may be implemented by the processor. The processor may be an integrated circuit chip with signal processing capabilities. In the implementation process, various steps of the methods described above may be performed by an integrated logic circuit of hardware or a software instruction in the processor. The processor described above may be a general-purpose processor, a digital signal processor (DSP), or another programmable logic device, another discrete gate or transistor logic device, another discrete hardware component, or the like. The processor may implement or execute various methods, steps and logic block diagrams disclosed in the embodiments of the present invention. The general-purpose processor may be a microprocessor or any conventional processor. The steps of the methods disclosed by the embodiments of the present invention may be directly implemented by a hardware decoding processor, or may be implemented by a combination of hardware and software modules in the decoding processor. The software module may be located in a storage medium located in the memory. The processor reads information in the memory and implements the steps of the methods described above in combination with hardware of the processor.

It can be understood that the communication node provided in the embodiments of the present application may also include a communication module for sending or receiving information such as mapping relationships, associations, scheduling information, etc.

Although the embodiments disclosed by the present application are as described above, the content thereof is merely embodiments for facilitating the understanding of the present application and is not intended to limit the present application. Any person skilled in the art to which the present application pertains may make any modifications and variations in the implementation forms and details without departing from the spirit and scope disclosed by the present application, but the patent protection scope of the present application is still subject to the scope defined by the appended claims.

What is claimed is:

1. A power control method, comprising:
   configuring, by a first communication node, an association between at least one first power control parameter for uplink transmission and sounding reference signal information; and
   sending, by the first communication node, an indication indicating a sounding reference signal of the uplink transmission to a second communication node,
   wherein the indication and the association are used by the second communication node to determine at least one second power control parameter for the uplink transmission, and
   wherein for a non codebook based transmission, the association is between the first power control parameter and combinations of a plurality of sounding reference signal resources, and
   wherein the at least one first power control parameter comprises an open-loop power control parameter, a path loss measurement parameter, and a closed-loop power control process index.

2. The method of claim 1, wherein the sounding reference signal is configured for determining a precoding matrix of the transmission.

3. The method of claim 1, wherein the sounding reference signal information comprises at least one of: at least one sounding reference signal resource index, or at least one sounding reference signal resource combination index.

4. The method of claim 1, further comprising configuring, by the first communication node, a sounding reference signal resource set including a plurality of sounding reference signal resources.

5. A power control method, comprising:
   receiving, by a second communication node from a first communication node, an association between at least one first power control parameter for uplink transmission and sounding reference signal information;
   receiving, by the second communication node from the first communication node, an indication indicating a sounding reference signal; and
   determining, by the second communication node, at least one second power control parameter for the uplink transmission according to the indication and the association,
   wherein for a non codebook based transmission, the association yields a mapping between the first power control parameter and combinations of a plurality of sounding reference signal resources, and
   wherein the at least one first power control parameter comprises an open-loop power control parameter, a path loss measurement parameter, and a closed-loop power control process index.

6. The method of claim 5, wherein the sounding reference signal is configured for determining a precoding matrix of the transmission.

7. The method of claim 5, wherein the sounding reference signal information comprises at least one of: at least one sounding reference signal resource index, or at least one sounding reference signal resource combination index.

8. A first communication node, comprising:
   a processor coupled with memory, configured to:
     configure an association between at least one first power control parameter for uplink transmission and sounding reference signal information; and
     send an indication indicating a sounding reference signal of the uplink transmission to a second communication node,
   wherein the indication and the association are used by the second communication node to determine at least one second power control parameter for the uplink transmission, and
   wherein for a non codebook based transmission, the association is between the first power control parameter and combinations of a plurality of sounding reference signal resources and
   wherein the at least one first power control parameter comprises an open-loop power control parameter, a path loss measurement parameter, and a closed-loop power control process index.

9. The first communication node of claim 8, wherein the sounding reference signal is configured for determining a precoding matrix of the transmission.

10. The first communication node of claim 8, wherein the sounding reference signal information comprises at least one of: at least one sounding reference signal resource index, or at least one sounding reference signal resource combination index.

11. The first communication node of claim 8, wherein the processor is further configured to configure a sounding reference signal resource set including a plurality of sounding reference signal resources.

12. A second communication node, comprising:
a processor coupled with memory, configured to:
receive, from a first communication node, an association between at least one first power control parameter for uplink transmission and sounding reference signal information;
receive, from the first communication node, an indication indicating sounding reference signal; and
determine a second power control parameter for the uplink transmission according to the indication and the association,
wherein for a non codebook based transmission, the association is between the first power control parameter and combinations of a plurality of sounding reference signal resources, and
wherein the at least one first power control parameter comprises an open-loop power control parameter, a path loss measurement parameter, and a closed-loop power control process index.

13. The second communication node of claim 12, wherein the sounding reference signal is configured for determining a precoding matrix of the transmission.

14. The second communication node of claim 12, wherein the sounding reference signal information comprises at least one of: at least one sounding reference signal resource index, or at least one sounding reference signal resource combination index.

15. The second communication node of claim 12, wherein a sounding reference signal resource set includes the plurality of sounding reference signal resources.

* * * * *